United States Patent [19]
Daniels et al.

[11] Patent Number: 5,874,498
[45] Date of Patent: Feb. 23, 1999

[54] VINYL ACETATE EMULSIONS FOR HIGH SCRUB PAINTS

[75] Inventors: Christian Leonard Daniels, Macungie; Leon Edward Newman, Emmaus, both of Pa.

[73] Assignee: Air Products and Chemicals, Inc., Allentown, Pa.

[21] Appl. No.: 610,785

[22] Filed: Mar. 11, 1996

[51] Int. Cl.$^6$ ........................................ C08L 29/04
[52] U.S. Cl. ........................... 524/563; 524/560; 524/561
[58] Field of Search ........................... 524/563, 501, 524/560, 561

[56] References Cited

U.S. PATENT DOCUMENTS

| | | | |
|---|---|---|---|
| 3,404,113 | 10/1968 | Lindermann et al. | 524/809 |
| 3,440,199 | 4/1969 | Lindemann et al. | 523/410 |
| 3,563,944 | 2/1971 | Bauer | 524/157 |
| 3,969,296 | 7/1976 | Wassenburg et al. | 524/845 |
| 3,985,698 | 10/1976 | Matsudaira et al. | 524/501 |
| 4,219,454 | 8/1980 | Iacoviello et al. | 524/812 |
| 5,470,906 | 11/1995 | Craun | 524/507 |

*Primary Examiner*—Mark L. Warzel
*Attorney, Agent, or Firm*—Russell L. Brewer

[57] ABSTRACT

This invention relates to improved vinyl acetate-ethylene emulsions for use in formulating high performance paints without the need for coalescing solvents. These latexes are based on copolymers of vinyl acetate and ethylene optionally containing a comonomer such as an alkyl acrylate or methacrylate. Paints formulated from these latexes, without coalescing solvents, are characterized as having substantially no insolubles, the resin particles in the emulsion are characterized as having a particle size of from 0.2 to 0.35 microns measured as weight average by capillary hydrodynamic fractionation. In other words, the copolymer particles are characterized in that a small percentage, up to about 5% of the total number of particles in the latex, have an average size greater than 0.35 microns, and a small percentage have a size smaller than about 0.2 microns. Further the resin particles are essentially monodisperse. Ethylene in place of the conventional acrylate as the low Tg monomer wit the resulting resin particles having a Tg of from minus −5° to 8° C.

The improved process for producing the emulsion or latex includes as an important component the formation of a seed latex and then polymerizing the monomers in the presence of the seed, the monomers being introduced over a period of time.

15 Claims, No Drawings

VINYL ACETATE EMULSIONS FOR HIGH SCRUB PAINTS

TECHNICAL FIELD OF THE INVENTION

This invention relates vinyl acetate-ethylene emulsions for use in preparing water based paints.

BACKGROUND OF THE INVENTION

This invention relates to latex compositions or paint vehicles as they are sometimes referred for paint compositions. Latex paint compositions have captured a significant portion of the indoor and outdoor paint market because they have several advantages as compared with those of the organic solvent type. Three significant advantages are: the paints offer a easy mechanism for cleanup, there is substantially no air pollution and there is a reduced possibility of fire hazard. On the other hand, the coating properties and storage stability of the latex paints have been somewhat inferior to those of the solvent type, particularly in obtaining desired film thickness, durability and adhesion.

In today's environment solvent emission is of great concern and there is significant government regulation in an effort to decrease the level of volatile organic compounds (VOC) emitted to the atmosphere and to the level of human exposure concerns. Recent focus of exposure concerns has been on institutional settings where a facility is operation continuously, such as hospitals. Such an operation does not allow for painting to be conducted during "off" hours, when human exposure can be minimized. Latex formulations contribute to reduced emission and exposure.

Two types of emulsions commonly used in formulating latex paints include the all acrylic system, e.g., the systems employing copolymerized methyl methacrylate, butyl acrylate, or 2-ethylhexylacrylate with small proportions of acrylic acid, etc., as may be desired, and vinyl acetate formulations usually in combination with a small proportion of the above lower alkyl acrylates, e.g., butyl acrylate. Heretofore, the all acrylic system has been used in premium quality paints as the emulsions have provided for good water resistance, desired leveling, film hardness, durability, scrubability, etc. The vinyl acetate-acrylic copolymer systems have been utilized in formulating interior flat and semi-gloss paints and exterior house paints. The vinyl acetate-butyl acrylate latices when used in paint formulations result in paint films which have excellent toughness, scrub resistance and durability, while the vinyl acetate-dibutyl maleate emulsions impart good abrasion resistance and flexibility as well as durability.

Conventional vinyl acetate based latex vehicles often require a coalescing solvents in order for the latex to be suitable for use in a paint formulation. Coalescing solvents are incorporated into the paint composition to externally and temporarily plasticize the latex polymer for a time sufficient to develop film formation. They diffuse out of the coalesced film after film formation and thus contribute to the VOC level emitted to the environment. Paints formulated with standard vinyl-acrylic latex vehicles and no coalescing solvent generally do not pass the requirement of film formation at temperatures as low as 40° F. Such paints also display cracking upon drying and provide poor durability. One approach to attempt to overcome these deficiencies is to increase the acrylate level to lower the minimum film formation temperature of the latex. Although the approach addresses the cracking and durability problems, paints prepared from these latexes are more costly and they also display dirt pickup, due to unacceptably tackiness after drying. Therefore, the hurdle is to prepare a latex which permits a low film formation temperature without causing the dried film to become tacky and to have sufficient hardness to retain good durability.

Specific examples of acrylic and vinyl ester paint vehicle systems are shown in the following U.S. Patents.

There are numerous patents which describe paint compositions incorporating a vinyl acetate-ethylene emulsion as a binder. Representative patents include U.S. Pat. Nos. 3,404,112 and 3,404,113. The '112 patent discloses the use of vinyl acetate-ethylene latexes as a film-forming binder in an aqueous paint composition. The '113 patent incorporates a triallylcyanurate in the polymerization process to enhance the degree of insolubles. The particle size of the binder will range from about 0.1 to 2 microns. The ethylene content will range generally from 5 to 40, preferably about 15% by weight of the polymer.

U.S. Pat. No. 3,440,119 discloses aqueous paint compositions incorporating an inter polymer of vinyl acetate, ethylene and glycidyl acrylate. The addition of the glycidyl acrylate into the polymer system enhances adhesion to raw wood without the use of a primer coat.

U.S. Pat. No. 4,219,454 discloses the use of a vinyl acetate copolymer emulsion for preparing semi-gloss and flat interior paint compositions. Vinyl acetate-ethylene emulsions were disclosed with preferred latexes having a particle size such that less than 5% of the particles had a size greater than 0.65 microns and less than 5% had a particle size of less than 0.33 microns. Emulsions were prepared by introducing the monomers of vinyl acetate, optionally with a small amount of butyl acrylate into a stabilizer system of water, hydroxyethyl cellulose and multiple nonionic surfactants. The Tg of the vinyl acetate ethylene polymer was approximately 22%, preferred levels of ethylene from about 10 to 15% by weight.

U.S. Pat. No. 5,470,906 discloses an aqueous ambient dry paint coating incorporating an emulsion copolymerized addition polymer containing an oligomer selected from polyurethane or polyester having a Tg below about −20° C. and a number average molecular weight between 300 and 5,000. The coating is free of organic coalescing solvents. Vinyl acetate and butylacrylate (80/20) are disclosed as conventional polymeric binders for consumer based paints with the binder having an elevated Tg lowered temporarily through the use of a volatile coalescing solvent. Low molecular weight oligomers of urethanes and polyester urethane copolymers were used in place of conventional coalescing solvents to achieve desired properties without objectionable odor and VOCS.

U.S. Pat. No. 3,969,296 discloses a process for producing a vinyl acetate emulsion having improved adhesion characteristics against usual wet-cleaning with a cloth, sponge, etc. The emulsion is prepared by copolymerizing a small amount of a glycidyl ester of an alpha-beta ethylenically unsaturated acid with vinyl acetate followed by neutralization with ammonia.

U.S. Pat. No. 3,563,944 discloses a colloid-free vinyl acetate emulsion suited for producing paint formulations having good scrub resistance, film forming properties, mechanical stability, etc. The copolymer consists of vinyl acetate and a lower alkyl acrylate, or an alkyl maleate. Enhanced stability is imparted by polymerizing a portion of the monomers in a colloid-free aqueous medium and then adding more monomer during the course of reaction and using a nonionic surfactant to stabilize the polymerization.

SUMMARY OF THE INVENTION

The invention relates to improved vinyl acetate-ethylene latexes fro use in preparing water based paints. The vinyl acetate-ethylene latexes consist essentially of from about 80% to 95% vinyl acetate by weight. from about 5–20% ethylene by weight and 0 to 10% of a comonomer by weight and the resin particles are characterized as having a size of from 0.2 to 0.35 microns, preferably from 0.2 to 0.26 microns, average by weight as measured by capillary hydrodynamic fractionation (CHDF), a glass transition temperature of from −5° to 8° C., preferably −1° to 4° C., and substantially free of an insoluble fraction in toluene at 25° C. The intrinsic viscosity in toluene (25° C.) is from 1.1 to 1.6.

The invention also relates to a process for forming the above vinyl acetate-ethylene latexes. The improvement for forming the aqueous emulsions comprises:

forming a seed polymer consisting essentially of polymerized units vinyl acetate by emulsion polymerization;

polymerizing vinyl acetate and ethylene in the presence of said seed polymer emulsion, said emulsion stabilized with a surfactant system comprising.

There are numerous advantages associated with the emulsion described herein and these include:

a paint displaying excellent film formation at temperatures as low as 40° F.;

an ability to produce paints having a low volatile organic compound (VOC) content;

an ability to formulate paint films having excellent durability and resistance to deterioration from abrasion, i.e.; the paints are resistant to scrub; the durability of these paints often exceeds that of conventional vinyl-acrylic systems;

an ability to manufacture of a latex polymer that serves as a suitable binder for the formulation of paints that are substantially free of coalescing solvents; and, an ability to formulate paints having low odor and therefore display obvious advantages from both an environmental and health perspective.

DETAILED DESCRIPTION OF THE INVENTION

Emulsion polymerization of ethylenically unsaturated monomers, and particularly vinyl acetate, is effected in an aqueous medium under pressures not exceeding 100 atmospheres in the presence of a catalyst and at least one emulsifying agent, the aqueous system being maintained by a suitable buffering agent, within a preselected pH range, typically within a pH of from about 4 to 6. The control of pH during polymerization is necessary in order to avoid premature hydrolysis. The emulsion polymerization process used herein is in contrast to the conventional batch process which involves a homogenization period in which a portion of the vinyl acetate is suspended in water and is thoroughly agitated in the presence of a comonomer such as ethylene while the vinyl acetate is gradually heated to polymerization temperature.

The emulsion polymerization process employed here is similar to that described in U.S. Pat. No. 4,219,454 with some exceptions. To aid in controlling the small particle size and molecular weight required of the resin particle, a "seed" polymer is formed prior to effecting polymerization of the major portion of monomers. The seed is based on polyvinyl acetate, optionally with a slight amount of comonomer and preferably a comonomer other than ethylene. The remaining monomers (80 to 95% by weight) to be polymerized are added incrementally (delay addition) along with surfactant over time to the seed polymer contained in the primary reaction vessel. The catalyst system comprising the oxidizing agent and reducing agent are added to maintain a preselected reaction rate.

A variety of comonomers, e.g., ethylenically unsaturated monomers can be copolymerized with the vinyl acetate and ethylene. For example, $C_1$–$C_8$ alkyl vinyl ethers, $C_{1-8}$ esters and amides of acrylic acid and methacrylic acid and unsaturated carboxylic acids can be copolymerized with the vinyl acetate and ethylene to produce a variety of polymeric vehicles. Examples of useful alkyl vinyl ethers are methyl vinyl ether, ethyl vinyl ether, isopropyl vinyl ether, n-propyl vinyl ether, tert-butyl vinyl ether and n- and isobutyl vinyl ether. Examples of esters of acrylic acid and methacrylic acid include methyl methacrylate, butyl acrylate, and 2-ethylhexyl acrylate. Butyl acrylate is preferred. Hydrophilic monomers may be used. On the one hand their use often contributes to reduced water resistance as evidenced by reduced wet scrub. On the other hand, a small addition of such monomers often enhances freeze-thaw stability. The desired incorporation level is at the discretion of the formulator. Examples of hydrophilic monomers include acrylamide, methacrylamide, N-vinylformamide, N-methylol acrylamide, etc. and unsaturated acids which include acrylic and methacrylic acid and crotonic acid. Other suitable monomers include N-vinylpyrrolidone. Esters of dicarboxylic acids such as esters of maleic fumaric, itaconic acids, etc. and $C_{6-12}$ alkanols also may be polymerized with the vinyl acetate and ethylene monomers. Example include dioctyl maleate, etc. Crosslinking monomers such as triallylcyanurate are to be avoided as these monomers tend to increase the level of insolubles of the polymer. Generally less than 10% by weight of the polymeric resin particles is comprised of a monomer other than vinyl acetate and ethylene and preferably less than 5% of the polymeric resin particle is comprised of an optional comonomer.

The preferred vinyl acetate-ethylene copolymers contain from about 85 to 95% by weight of vinyl acetate, 10 to 15% by weight of ethylene and 0 to 5% by weight of butyl acrylate. The sum of the percentages of the monomers employed to form the copolymer is always 100.

The initiator is employed in the amount of 0.1 to 2%, preferably 0.25 to 0.75%, based on the weight of vinyl acetate introduced into the system. The activator is ordinarily added as an aqueous solution and the amount of activator is generally from 0.5 to 3 times the amount of initiator.

We believe the significant feature for providing for the overall combination of properties in a latex paint formulation is attributable to the small particle size range present in the emulsion. The copolymer particles in the latex of this invention have a very narrow particle size distribution with only a small proportion of particles larger than 0.35 microns and a small proportion having a particle size less than 0.2 microns as measured by CHDF. When the proportion of large particles is high, scrub resistance of the resulting paint is reduced On the other hand, where the concentration of fines, i.e., those particles having a size less than 0.2 microns, is high, e.g., above about 10%, the paint will have poor flow and leveling characteristics. As a result, the paint with too many fines will show ridges and brushmarks.

There has been found only one way which is consistent for preparing the emulsions of this invention. That technique is to use a standard premix of protective colloid, surfactant, oxidizing agent and vinyl acetate (5 to 20% by weight of the vinyl acetate monomer to be polymerized) as a seed forming monomer and then delay the addition of monomer, additional surfactant and reducing agent. More specifically, a standard premix containing water, protective colloid, surfactant, free radical initiator, buffer and vinyl acetate monomer is charged to a primary vessel. In the premix, the protective colloid preferably is hydroxyethyl cellulose although other protective colloids such as polyvinyl alcohol, casein, hydroxyethyl starch, carboxymethyl cellulose can be used. The protective colloid is added in conventional amounts, e.g., from about 0.05–1% by weight of total monomer to be polymerized. Generally, it is added in a small proportion, e.g., 0.1 to 0.15%. The protective colloid is not necessary in terms of performance of the latex but is used more to reduce the level of grit formation in the polymerization process.

The surfactants are used in are used in conventional amounts, i.e., 2 to 7% by weight of the latex to stabilize the emulsion. Generally, they are nonionic emulsifying agents and include polyoxyethylene condensates, e.g. polyoxyethylene aliphatic ethers, polyoxyethylene aralkyl ethers, condensates of ethylene oxide and tall oil acids and the like. Preferred nonionic emulsifying agents are sold under the trademark "Pluronic". The "Pluronics" have the general formula:

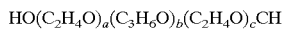

$$HO(C_2H_4O)_a(C_3H_6O)_b(C_2H_4O)_cCH$$

where a, b, and c are integers of 1 or above. As b increases, the compounds become less water soluble or more oil soluble and thus more hydrophobic when a and c remain substantially constant. Some examples conforming to the above general formula contain a polyoxypropylene chain which has a molecular weight of 1500 to 1800 and a polyoxyethylene content from 40 to 50 percent of the total weight of the molecule and a cloud point of about 140° F. This surfactant is marketed under the trademark "Pluronic L-64." Another example is one which has polyoxypropylene chain having a molecular weight of 1500 to 1800, a polyoxyethylene content from 80 to 90 percent of the total weight of the molecule and a cloud point of about 212° F. This surfactant is marketed under the trade mark "Pluronic F-68."

Another class of nonionic surfactants are sold under the trademark IGEPAL, and are generally polyoxyethylene aralkyl ethers. They are represented by the formula:

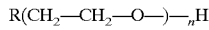

$$R(CH_2-CH_2-O-)_nH$$

where R is the residue of a fatty alcohol containing from 10 to 18 carbon atoms, an alkyl phenol, a fatty acid containing 10 to 18 carbon atoms, and amide an amine or a mercaptan and where n is an integer of 1 or above. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thio-ethers such as polyoxyethylene n-dodecyl thio-ether. Two preferred surfactants include IGEPAL CO-630 which has a cloud point between 126°–133° F. and IGEPAL CO-887, which has a cloud point above 212° F. Both are polyoxyethylenenonylphenyl ethers.

Surfactants similar to the Igepal surfactants include a polyoxyethylene octylphenyl ether having a cloud point of between 80° F. and 160° F. marketed under the trademark "Triton X-100", a polyoxyethylene oleyl ether having a cloud point of between 80° F. and 160° F. marketed under the trade mark "Atlas G-3915" and a polyoxyethylene lauryl ether having a cloud point above 190° F. marketed under the trademark "Brij 35."

The concentration range of the total amount of emulsifying agents used in emulsion polymerization is from 2 to 7% based on the solids in the latex. The stabilizers employed are, in part, governed by the desired particle size. Typically, the level of the Igepal type surfactants is maintained from 1 to 4% by weight of the latex. High levels contribute to water sensitivity in the resulting paint. The Pluronic type surfactants are employed in an amount of from 2 to 5% by weight of the latex.

In order to maintain the pH of the system at the desired value, there is suitably added an alkaline buffering agent of any convenient type. Any alkaline material which is compatible with the stabilizing agent can be used as the buffer. The amount of buffer is that sufficient to adjust the pH of the system within the desired range, e.g., 3.5 to 10 and preferably 4 and 5.5. Sodium acetate is the preferred buffer because of its compatibility with the system and its low cost. The amount of buffer is generally about 0.05 to 0.5% by weight, based on the monomers. Other buffers such as sodium citrate, disodium phosphate, and the like, can, however, be used.

The free radical initiating catalyst used to effect polymerization is commonly referred to as a redox catalyst. The redox catalysts, as known, comprise an oxidizing agent and reducing agent. The oxidizing and reducing components can be any of those conventionally used in vinyl acetate emulsion polymerization. Examples of preferred oxidizing components are hydrogen peroxide, potassium persulfate, t-butyl peroxypivalate, t-butyl hydroperoxide, etc. and preferred reducing agents include sodium formaldehyde sulfoxylate, ferrous ammonium sulfate and sodium erythrobate.

Reaction temperatures for emulsion polymerizing the vinyl acetate and comonomers are conventional. The reaction temperature can be controlled by the rate of catalyst addition and by the rate of the heat dissipation therefrom. Generally, it is advantageous to maintain a temperature from about 50° to 70° C. and to avoid temperatures in excess of 80° C. While temperatures as low as 0° can be used, economically, the lower temperature limit is about 40° C.

The reaction time will also vary depending upon other variables such as the temperature, the catalyst, and the desired extent of the polymerization. It is generally desirable to continue the reaction until less than 0.5% of the vinyl acetate remains unreacted. Under these circumstances, a reaction time of about 6 hours has been found to be generally sufficient for complete polymerization, but reaction times ranging from 3 to 10 hours have been used, and other reaction times can be employed, if desired.

In effecting polymerization of the monomers to form the latex, a premix of water, vinyl acetate (optionally a small level of comonomer) protective colloid, e.g., hydroxyethyl cellulose and free radical initiation oxidizing agent are charged to a primary vessel in conventional amount. Typically, form about 5 to 20% by weight of he vinyl acetate to be polymerized is polymerized in the primary vessel to form the seed polymer along with from about 0–70%, and typically 20–50% of the total surfactant employed is charged to the primary vessel and mixed therein. The remainder of the vinyl acetate, optionally with other comonomers and surfactant is mixed with the monomers in a secondary vessel or added separately. In either case, they are added as a delay.

To polymerize then, the monomers, oxidizing agent, surfactant and the reducing agent, sodium erythrobate are added to the primary vessel over a period of time and at a rate such that the unreacted vinyl acetate in the primary vessel is maintained at about 3–10% by weight of the emulsion or latex. After all of the monomers are added to the primary vessel, the residual vinyl acetate then is reduced to less than about 0.5% by addition of additional oxidizing agent and reducing agent. At the end of the polymerization, the pH may be adjusted to about 5.5, usually with ammonium hydroxide.

With respect to the polymerization procedure, the protective colloid, particularly the cellulose ether, is used to maintain emulsion stability. Higher levels of colloids, e.g., >0.15% although tending to enhance stability due so at the expense of increased particle size. In contrast to the colloid, the surfactant, particularly those of the Igepal type, tend to reduce particle size when present in the initial polymerization and they contribute to better particle size control and emulsion stability when added with the monomers as a delay. By working the protective colloid and surfactant together, particle size optimization can be achieved.

In practicing the above procedure to form a latex having a desired particle size, it probably will be necessary, utilizing the principles set forth regarding the effect of colloid and surfactant, to adjust the level of protective colloid or surfactant concentration in the primary vessel or surfactant which is added as a delay. If initially the particle size shows a higher percentage of small particles than is desired, then the protective colloid should be increased and surfactant fraction in the primary vessel reduced and added as a delay. If, on the other hand the particle size is large, the particle size can be reduced by reversing the above procedure. As a rule of thumb, the particle size can be decreased by adding surfactant to the primary vessel and increased by adding surfactant to the secondary vessel. Alternatively, particle size can be increased by adding colloid or decreased by reducing colloid. Thus, by bracketing the particle size distribution, it is relatively easy to hone in and produce latex having the desired particle size distribution.

Agitation is another variable which can affect particle size in the polymer emulsion. Agitation should be mild so that appropriate heat transfer can be achieved and product stability maintained. Vigorous agitation is to be avoided. In terms of particle size control, if larger particles are desired, the agitation rate can be reduced; and if smaller particles are required, the degree of agitation can be increased. If agitation cannot be modified, then surfactant or protective colloid adjustment must be made. This is why in commercial operations wherein agitation is vigorous to effect heat transfer, most of the surfactant is added as a delay rather than to the primary vessel.

The following examples are provided to illustrate preferred embodiments of the invention and are not intended to restrict the scope thereof. All percentages are expressed as weight percentages, and all temperatures are in degrees centigrade.

All polymers were prepared in a 1 gallon stainless steel reactor capable of pressures up to about 1200 psi. The reactor was equipped with a jacket for cooling, a mechanical turbine agitator, and metering pumps for continuous addition of the various feeds. The terms primary and secondary vessel have been used for convenience in describing the polymerization procedure. A single vessel may be used although it is more convenient to use multiple vessels. Deionized water was used for all experiments.

In preparing the paint latex the formulations are based on an assumed 1900 grams of polymer result from the polymerization, including seed polymer, and that 95% of the ethylene added to the reactor is incorporated into the polymer.

EXAMPLE 1

Preparation of Vinyl Acetate-Ethylene Latex Incorporating a Small Level of Butyl Acrylate Primary Vessel
 Preparation of Vinyl Acetate Seed Latex
 Incorporating a Small Level of Butyl Acrylate
 To a one gallon SS reactor was initially charged the seed stabilizing system followed by addition of the monomers mixed with surfactant.

| Compound | grams |
|---|---|
| Deionized Water | 1200 |
| Natrosol 250 LR | 2 |
| Igepal CO-887 | 43.7 |
| Igepal CO-630 | 10.4 |
| Sodium acetate | 1 |
| Ferrous Ammonium Sulfate | 0.15 |
| Vinyl Acetate | 152 |
| Butyl Acrylate | 38 |

Natrosol 250LR ™ (hydroxyl ethyl cellulose supplied by Aqualon Inc.),
Igepal CO-887 (70% solution of a 30% mole nonyl phenol ethoxylate supplied by Rhone-Poulenc),
Igepal 630 (10 mole nonyl phenol ethoxylate supplied by Rhone-Poulenc),
Pluronic F-68 the polyoxypropylene chain has a molecular weight of 1500 to 1800 and the polyoxyethylene content is from 80 to 90 percent of the total weight of the molecule and having a cloud point of about 212° F.
Pluronic L-64 has a molecular weight of 1500 to 1800 and the polyoxyethylene content is from 40 to 50 percent of the total weight of the molecule, a polyoxypropylene having a cloud point of about 140° F.

After the water, colloid and surfactants were charged to the reactor, the pH of the mixture was adjusted to a range of from 4 to 4.3 with 2.5 g of acetic acid. To this mixture was added 152 g of vinyl acetate and 38 g of butyl acrylate. The contents of the reactor were purged with nitrogen followed with a purge with ethylene and then heated under agitation to 55° C. The pressure was maintained at about 500 psig. Redox feeds consisting of 5% solution of sodium erythorbate and 2% solution of t-butyl hydroperoxide were fed to the reactor at 0.4 g/min and 0.2 g/min respectively. Addition of the redox feeds was continued for 15 min until the exotherm was complete, after which the feeds were discontinued. The unreacted vinyl acetate was less than 0.5% by weight of the emulsion.

EXAMPLE 2

Preparation or Vinyl Acetate-Ethylene Latex For Paint

Five minutes after the feeds in Example 1 were discontinued, 140 g of a prepared mixture was added. The prepared mixture was composed of 1402.3 g of vinyl acetate, 46.35 g of Pluronic F-68™, and 15.4 g of Pluronic L-64™ ethylene oxide-propylene oxide triblock copolymer. The vessel was then pressurized to 500 psig with ethylene. The sodium erythorbate and t-butyl hydroperoxide feeds were both restarted at 0.2 g/min and upon evidence of exotherm the remainder of the prepared vinyl acetate-Pluronic mixture was added uniformly over 3 hours. Addition of the redox feeds was continued for an additional 40 min to reduce the amount of unreacted monomer. The contents were then cooled to 32° C. and transferred to a secondary 3 gallon vessel where vacuum was used to remove any unreacted ethylene. At this point 2 g of Colloids™ 675 (a commercial defoamer supplied by Rhone-Poulenc) was added to reduce foaming of the latex during stripping. Then 1 g of sodium erythorbate in 10 g of water followed by 1 g of t-butyl hydroperoxide in 10 g of water were added to remove residual monomers and reduce the level to less than 0.1% by weight of the emulsion.

The physical properties of the resultant latex were: 56.0% non-volatiles (solids), Tg=2.7° C., a viscosity of 1610 cps (Brookfield LVF viscometer, #3 spindle, 60 rpm), a pH of 4.43, coagulum <0.02% on 100 mesh screen. The particle size on a weight average was from 0.2 to 0.26 $\mu$ as measured by capillary hydrodynamic fractionation, (CHDF), the insolubles in toluene were less than 1% by weight (25° C.) and the intrinsic viscosity in toluene at 25° C. was 1.16.

EXAMPLE 3

Preparation of Vinyl Acetate-Ethylene Latex Incorporating a Small Level of Acrylic Acid The procedure was identical to example 1 except, 100 g of water was removed from the initial charge and the solution was pH adjust to 4.3 with 2.7 gms of acetic acid and in addition, a solution of 8.5 g of acrylic acid in 141.5 g of water were charged uniformly to the reactor over the same 3 hr period as the prepared mixture of Pluronic surfactant and vinyl acetate.

The physical properties of the resultant latex were: 55.6% non-volatiles, the Tg was 0.1° C., the viscosity was 1504 cps (Brookfield LVF viscometer, #3 spindle, 60 rpm), pH 4.6, coagulum <0.02% on 100 mesh screen. The particle size on a weight average was estimated to be from 0.21 to 0.26 $\mu$, the insolubles in toluene were less than 1%.

EXAMPLE 4

Preparation of Vinyl Acetate-Ethylene Latex Without Butyl Acrylate and Acrylic Acid Incorporation The procedure of Example 1 was repeated except butyl acrylate was eliminated from the initial charge and the vinyl acetate initial charge was increased to 190 g to compensate for the lack of butyl acrylate.

The physical properties of the resultant latex were: 56.2% non-volatile, Tg=1.0° C., 1180 cps (Brookfield LVF viscometer, #3 spindle, 60 rpm), pH 4.2, coagulum <0.02% on 100 mesh screen. The particle size on a weight average was estimated to be from 0.21 to 0.26 $\mu$, and the insolubles in toluene were less than 1%

EXAMPLE 5

Evaluation in Latex Paints

The latexes of Examples 2–4 were formulated into flat paints for performance evaluations. Paints having a pigment volume concentration of 60% were prepared. A 3 mil film of the paints were drawn down on Lenetta scrub panels and allowed to dry for three days prior to evaluating wet scrub durability. After the dry period the panels were scrubbed using a standard ASTM abrasive. Failure was identified as 50% wear through of the film. Each example was compared to a high scrubbing vinyl acrylic latex that was formulated with coalescing solvents. The results are reported as the percent of scrub cycles to failure verses the vinyl acrylic control, 100% being equal to the control. Film formation at 40° F. was also evaluated and reported as the level of cracking experienced upon drying a 6 mil draw down. The following formulation was used in preparing the paints:

| Raw Materials | Grams |
|---|---|
| Natrosol Plus 330 (2% solution) | 100.0 |
| Nopcosperse 44 commercial dispersant | 6.0 |
| Kathon LX 1.5 biocide | 1.0 |
| KTPP commercial dispersant | 3.0 |
| Igepal CO-610 | 3.0 |
| Drewplus L-424 defoamer | 3.0 |
| Ti-Pure R-900 pigment | 225.0 |
| Huber 683 clay | 100.0 |
| Atomite calcium carbonate | 225.0 |
| Drewplus L-424 defoamer | 2.0 |
| Water | 125.0 |
| Latex @ 55.0% solids | 291.17 |
| Natrosol Plus 330 (2%) | 146.0 |
| Totals | 1128.17 |

| Latex | Wet Scrub Resistance | Film Formation 40° F. |
|---|---|---|
| Control High Scrubbing vinyl - acrylic (with solvents) | 100% | very slight cracking |
| Example 2 | 175% | slight to moderate cracking |
| Example 3 | 69% | moderate cracking |
| Example 4 | 152% | slight to moderate cracking |
| Commercial vinyl acetate-ethylene latex Tg −5° C., insolubles 60%, part. size 0.18$\mu$ | 15% | heavy cracking poor film formation |
| Commercial vinyl chloride/vinyl acetate/ethylene Tg 0° C., insolubles <1%, part size 0.16$\mu$ | 98% | heavy cracking poor film formation |

The above results show that the vinyl acetate emulsions having the desired Tg and particle size, preferably formed in the presence of a seed latex, gave superior properties to the conventional and commercial vinyl acetate/ethylene latexes. The paint vehicle formed using a seed comprising 2% butyl acrylate (/Example 2) gave superior results to the paint vehicle prepared from the polyvinyl acetate homopolymer seed (Example 4). The paint vehicle having the hydrophilic monomer, acrylic acid, had poorer wet scrub resistance but past 5 freeze thaw cycles. The commercial latexes had good scrub but in the absence of coalescing agents, they exhibited poor film formation at 40° F.

EXAMPLE 6

Vinyl Acetate/ Ethylene Paint Vehicles

The procedures of Examples 1 and 2 were followed utilizing variations on formulations for the purpose of determining their effect on the properties of the resultant paint. Various formulations were prepared and the levels of components varied

TABLE 1

| Peroxide Initiator 1% t-butyl peroxide | |
|---|---|
| Compound | grams |
| 70% t-butyl peroxide | 5.0 |
| distilled water | 345.0 |
| Total | 350.0 |

TABLE 2

Reducing Agent
2.5% sodium erythrobate

| Compound | grams |
|---|---|
| sodium erythrobate | 5.0 |
| distilled water | 195.0 |
| Total | 200.0 |

TABLE 3

Monomer Mix

| Run | 1 | 2 | 3 | 4 | 5 |
|---|---|---|---|---|---|
| Pluronic F-68 | 51.1 | 51.1 | 51.1 | 51.1 | 0 |
| Pluronic L-64 | 17 | 17 | 17 | 17 | 0 |
| Vinyl Acetate | 1715 | 1715.0 | 1715.0 | 1647.4 | 1405 |
| Butyl Acrylate | 42 | 42 | 0 | 0 | 0 |
| Acrylic Acid | 6.8 | 6.8 | 6.8 | | |
| 2-ethylhexyl acrylate | | | 42.0 | | |
| Methacrylic acid | | | | 10.4 | |
| Total of Mix Prepared | 1831.9 | 1831.9 | 1831.9 | 1725.9 | 1405 |

TABLE 4

Primary Vessel Conditions

| Compound | Grams | | | | |
|---|---|---|---|---|---|
| Run | 1 | 2 | 3 | 4 | 5 |
| Deionized Water | 1150 | 1150 | 1000.0 | 1200 | 1150 |
| Natrosol 250 LR (2% solution) | 100.0 | 100.0 | 100.0 | 0 | 100 |
| Igepal CO-887 | 43.7 | 43.7 | 43.7 | 43.7 | 43.7 |
| Igepal CO-630 | 10.4 | 10.4 | 10.4 | 10.4 | 10.4 |
| Pluronic L-64 | | | | | 15.5 |
| Pluronic F-68 | | | | | 46.3 |
| Sodium Citrate | 1.0 | 1 | 1.0 | 1.0 | 3.0 |
| Pressure (psig) | 10 | 500 | 10 | 10 | 10 |
| Initiator-total delay | 3.1 | 0 | 2.5 | 0.8 | 3.6 |
| Reducing Agent-total | 5.6 | 3.0 | | 2.1 | 6.6 |
| Ferrous Ammonium Sulfate (5%) | 3.0 | 3.0 | 3.0 | 3.0 | 3.0 |
| Monomer Mix | 190.0 | 248.0 | 190 | 0 | |
| Vinyl Acetate | | | | 152.0 | 152 |
| Butyl Acetate | | | | 38.0 | 38 |

TABLE 5

Secondary Vessel Conditions

| Compound | Grams | | | | |
|---|---|---|---|---|---|
| Run | 1 | 2 | 3 | 4 | 5 |
| pressure (psig) | 500 | 500 | 500 | 500 | 500 |
| Initiator (total added) | 107 | 110.8 | 108 | 92.1 | 65.2 |
| Reducing Agent (total) | 81.2 | 88.4 | 86.2 | 74.8 | 43.6 |
| Ethylene | 251 | 272 | 245 | 275 | 231 |
| Monomer Mix | 1464 | 1406 | 1464 | 1564 | 1400 |
| % total solids | 53.3 | 54.5 | 56.4 | 57.0 | A |
| % free Monomer | 0.32% | 0.32% | 0.43 | 01.5 | B |
| final pH | 4.36 | 4.16 | 4.5 | 4.65 | O |
| grit 100 mesh (ppm) | 75 | 94 | 16 | 157 | R |
| grit 325 mesh | 256 | 98 | 64 | 459 | T |

The results show that Run 1 had a resistance of 189% that of the control or in this case 805 cycles. Run 2 which was similar in formulation to Run 1 but different in terms or process had a scrub resistance of 520 cycles and 94% of the control. In this case, no seed was prepared prior to polymerization, Although the results were good, the scrub is not as good as when a major portion of the polymer is formed in the presence of a seed. Run 3 which employed 2-ethylhexyl acrylate as a comonomer in place of Run 1 and 2 was good but not as good as the control. thus, it can be concluded butyl acrylate contributes to the durability of the vinyl acetate -ethylene latex. It passed 450 cycles or about 80% of the control which had 550 cycles. Run 4 showed the effect of the addition of hydroxy ethyl cellulose to the primary vessel prior to polymerization of the monomers. The resultant latex had slightly more grit formation than the other runs. Run 5 show the problems in processing when all the surfactant is added to the primary vessel and independent from the monomer. In that case, the latex is extremely gritty. The run was aborted as the latex could not be used for formulating a paint (run 5). To correct that problem, the protective colloid level most likely would have to be increased to above 1%.

The properties in terms of gloss, contrast rations and reflectance of the Examples 2 and 4 compared favorably to commercial paints. They were, however, not freeze-thaw stable.

What is claimed is:

1. In a latex composition suited for use in preparing an aqueous based paint comprising water, pigment, and said latex comprising from about 40 to 70% of film forming polymerized resin particles, the improvement which comprises as latex wherein said polymerized resin particles contain from 80% to 95% vinyl acetate by weight, from about 5–20% ethylene by weight and 0 to 10% of a comonomer by weight, said polymerized resin particles in the latex having a particle size of from 0.2 to 0.35 microns average by weight as measured by capillary hydrodynamic fractionation, a glass transition temperature of from about minus 5° to about plus 8° C., substantially free of an insoluble fraction in toluene at 25° C. and an intrinsic viscosity in toluene of from 1.1° to 1.6° at 25° C.

2. The composition of claim 1 wherein said polymerized resin particles contain a polymerized units of an alkyl acrylate selected from the group consisting of ethyl, butyl, methyl, 2-ethylhexyl acrylate and ethyl, butyl, methyl, 2-ethylhexyl methacrylate.

3. The composition of claim 2 wherein said resin particle has from 85–95% vinyl acetate.

4. The composition of claim 3 wherein the Tg of the resin particles is from minus 1° to plus 4° C.

5. The composition of claim 4 wherein the particle size is from 0.2 to 0.26 microns as measured by capillary hydrodynamic fractionation.

6. The composition of claim 5 wherein said monomer is an acrylate, and said acrylate is butyl acrylate.

7. The composition of claim 6 wherein said resin particle contains from about 85 to 95% by weight vinyl acetate, 10 to 15% by weight ethylene and from 1 to 3% by weight butylacrylate.

8. In a process for forming a film forming vinyl acetate/ethylene containing latex composition by polymerizing a reaction mixture of vinyl acetate, ethylene, water, protective colloid, surfactant, free radical initiator and activator, the improvement for producing polymerized resin particles in the latex which impart wet scrub resistance in latex paints, said polymerized resin particles having a size of from 0.2 to 0.35 microns average by weight as measured by capillary hydrodynamic fractionation, a glass transition temperature of from minus 5° to plus 8° C., substantially free of an insoluble fraction in toluene at 25° C. and an intrinsic viscosity in toluene of from 1.1 to 1.6 at 25° C., said polymerized resin particles formed by the steps which comprise:

a) forming a premix by charging vinyl acetate, water, free radical initiator protective colloid and surfactant to a first vessel;

b) polymerizing the vinyl acetate in the premix to less than 0.5% vinyl acetate by weight, thereby forming a seed polymer;

c) polymerizing vinyl acetate and ethylene in the presence of the seed polymer, the vinyl acetate added a rate such that the percent of unreacted vinyl acetate in the latex during polymerization is maintained from about 3–10% by weight of the latex; and, d) effecting polymerization until the vinyl acetate content is less than 0.5% by weight of the latex.

9. The process of claim 8 wherein the polymerization is carried out at a temperature of from 40° to 85° C.

10. The process of claim 9 wherein said polymerized resin particles contain a polymerized units of an alkyl acrylate selected from the group consisting of ethyl, butyl, methyl, 2-ethylhexyl acrylate and ethyl, butyl, methyl, 2-ethylhexyl methacrylate.

11. The process of claim 10 wherein said resin particle has from 85–95% by weight vinyl acetate.

12. The process of claim 11 wherein the Tg of the resin particles is from −1° to 3° C.

13. The process of claim 12 wherein the particle size is from 0.2 to 0.26 microns as measured by capillary hydrodynamic fractionation.

14. The process of claim 13 wherein said monomer is an acrylate, and said acrylate is butyl acrylate.

15. The process of claim 14 wherein said resin particle contains from about 80 to 95% by weight vinyl acetate, 10 to 15% by weight ethylene and from 1 to 3% by weight butylacrylate.

* * * * *